United States Patent
Badrak

(10) Patent No.: US 7,168,606 B2
(45) Date of Patent: *Jan. 30, 2007

(54) METHOD OF MITIGATING INNER DIAMETER REDUCTION OF WELDED JOINTS

(75) Inventor: Robert P. Badrak, Sugar Land, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 305 days.

This patent is subject to a terminal disclaimer.

(21) Appl. No.: 10/360,546

(22) Filed: Feb. 6, 2003

(65) Prior Publication Data

US 2004/0155091 A1 Aug. 12, 2004

(51) Int. Cl.
*B23K 31/02* (2006.01)
*E21B 19/16* (2006.01)

(52) U.S. Cl. .................................. 228/155; 166/380
(58) Field of Classification Search ............ 228/13, 228/125, 155, 159–162, 214, 44.5; 166/380, 166/387; 175/61, 62

See application file for complete search history.

(56) References Cited

U.S. PATENT DOCUMENTS

| | | | | |
|---|---|---|---|---|
| 1,981,525 A | | 11/1934 | Price .......................... 166/4 |
| 2,258,751 A | * | 10/1941 | Evans ..................... 29/890.15 |
| 2,263,714 A | * | 11/1941 | Bloomfield et al. .......... 29/523 |
| 2,627,891 A | | 2/1953 | Clark ......................... 153/82 |
| 2,642,517 A | * | 6/1953 | Lindow ..................... 219/100 |
| 2,840,687 A | | 6/1958 | Rac, Jr. ..................... 219/158 |
| 3,191,677 A | | 6/1965 | Kinley ........................ 166/14 |
| 3,195,646 A | | 7/1965 | Brown ....................... 166/208 |
| 3,565,192 A | * | 2/1971 | McLarty ................... 175/246 |
| 3,712,376 A | | 1/1973 | Owen et al. ............... 166/277 |
| 3,757,877 A | * | 9/1973 | Leathers .................... 175/269 |
| 3,768,307 A | * | 10/1973 | Rode .......................... 73/105 |
| 3,818,734 A | | 6/1974 | Bateman ...................... 72/75 |
| 3,844,007 A | * | 10/1974 | Kojima ..................... 29/33 A |
| 3,911,707 A | | 10/1975 | Minakov et al. .............. 72/76 |
| 4,069,573 A | | 1/1978 | Rogers, Jr. et al. ........... 29/421 |
| 4,127,168 A | | 11/1978 | Hanson et al. ............. 166/123 |
| 4,159,564 A | | 7/1979 | Cooper, Jr. ................. 29/727 |

(Continued)

FOREIGN PATENT DOCUMENTS

EP 0 961 007 12/1999

(Continued)

OTHER PUBLICATIONS

Merriam-Webster's Collegiate Dictionary, 10th Edition, 1999, p. 161.*

(Continued)

*Primary Examiner*—Lynne R. Edmondson
(74) *Attorney, Agent, or Firm*—Patterson + Sheridan, LLP

(57) ABSTRACT

Aspects of the present invention provide methods and apparatus for connecting two tubulars using a welding process with reduced inner diameter flash. The method includes connecting an end of a first expandable tubular to an end of a second expandable tubular using a welding process and reducing an inner diameter flash using a flash reducing device. In one embodiment, the flash reducing device is a plug disposed in the bore of the two tubulars. In another embodiment, the flash reducing device is a roller member. In a further embodiment, the flash reducing device is a rotating cutting member.

44 Claims, 6 Drawing Sheets

U.S. PATENT DOCUMENTS

| | | | | |
|---|---|---|---|---|
| 4,288,082 | A | 9/1981 | Setterberg, Jr. | 277/125 |
| 4,319,393 | A | 3/1982 | Pogonowski | 29/434 |
| 4,483,399 | A | 11/1984 | Colgate | 166/308 |
| 4,509,777 | A | 4/1985 | Walker | 285/286 |
| 4,538,442 | A | 9/1985 | Reed | 72/367 |
| 4,723,905 | A | 2/1988 | Vassallo et al. | 425/392 |
| 5,052,483 | A | 10/1991 | Hudson | 166/55 |
| 5,348,095 | A | 9/1994 | Worrall et al. | 166/380 |
| 5,685,369 | A | 11/1997 | Ellis et al. | 166/195 |
| 6,000,482 | A | 12/1999 | Michalski | 175/57 |
| 6,012,523 | A | 1/2000 | Campbell et al. | 166/277 |
| 6,018,859 | A * | 2/2000 | Borzym et al. | 29/458 |
| 6,021,850 | A | 2/2000 | Wood et al. | 166/380 |
| 6,029,748 | A | 2/2000 | Forsyth et al. | 166/380 |
| 6,053,247 | A | 4/2000 | Wesson et al. | 166/297 |
| 6,098,717 | A | 8/2000 | Bailey et al. | 166/382 |
| 6,264,537 | B1 * | 7/2001 | Penza | 451/51 |
| 6,325,148 | B1 | 12/2001 | Trahan et al. | 166/297 |
| 6,425,444 | B1 | 7/2002 | Metcalfe et al. | 166/387 |
| 6,446,323 | B1 | 9/2002 | Metcalfe et al. | 20/523 |
| 6,446,724 | B2 | 9/2002 | Baugh et al. | 166/285 |
| 6,457,532 | B1 * | 10/2002 | Simpson | 166/380 |
| 6,527,049 | B2 | 3/2003 | Metcalfe et al. | 166/277 |
| 6,543,552 | B1 | 4/2003 | Metcalfe et al. | 175/57 |
| 6,578,630 | B2 | 6/2003 | Simpson et al. | 166/55.8 |
| 6,585,053 | B2 | 7/2003 | Coon | 166/387 |
| 2001/0040054 | A1 * | 11/2001 | Haugen et al. | 175/61 |
| 2001/0045284 | A1 | 11/2001 | Simpson et al. | |
| 2002/0005286 | A1 * | 1/2002 | Mazorow et al. | 166/255.3 |
| 2002/0145281 | A1 | 10/2002 | Metcalfe et al. | |
| 2002/0166668 | A1 | 11/2002 | Metcalfe et al. | |
| 2003/0037931 | A1 | 2/2003 | Coon | |
| 2003/0042022 | A1 | 3/2003 | Lauritzen et al. | |
| 2003/0047322 | A1 * | 3/2003 | Maguire et al. | 166/380 |

FOREIGN PATENT DOCUMENTS

| | | |
|---|---|---|
| FR | 1 448 304 | 9/1976 |
| GB | 2 345 308 | 7/2000 |
| WO | WO 00/37772 | 6/2000 |

OTHER PUBLICATIONS

The American Heritage Dictionary, 2$^{nd}$ College Edition, 1982, p. 229.*

* cited by examiner

METHOD OF MITIGATING INNER DIAMETER REDUCTION OF WELDED JOINTS

BACKGROUND OF THE INVENTION

1. Field of the Invention

The present invention relates to tubular connections. More particularly, the invention relates to methods of reducing the inner diameter of a welded joint. More particularly still, the invention relates to methods of reducing the inner diameter of a welded joint between two expandable tubulars.

2. Description of the Related Art

In the drilling of oil and gas wells, a wellbore is formed using a drill bit that is urged downwardly at a lower end of a drill string. After drilling a predetermined depth, the drill string and bit are removed, and the wellbore is typically lined with a string of steel pipe called casing. The casing provides support to the wellbore and facilitates the isolation of certain areas of the wellbore adjacent hydrocarbon bearing formations. The casing typically extends down the wellbore from the surface of the well to a designated depth. An annular area is thus defined between the outside of the casing and the earth formation. This annular area is filled with cement to permanently set the casing in the wellbore and to facilitate the isolation of production zones and fluids at different depths within the wellbore.

It is common to employ more than one string of casing in a wellbore. In this respect, a first string of casing is set in the wellbore when the well is drilled to a first designated depth. The well is then drilled to a second designated depth, and a second string of casing, or liner, is run into the well to a depth whereby the upper portion of the second liner overlaps the lower portion of the first string of casing. The second liner string is then fixed or hung in the wellbore, usually by some mechanical slip mechanism well-known in the art, and cemented. This process is typically repeated with additional casing strings until the well has been drilled to total depth.

However, one drawback of this process is that as the wellbore is extended, the inner diameter of the well progressively decreases. This is because subsequent liners must have an outer diameter that is smaller than an inner diameter of earlier casings in order to pass through the earlier casings. As a result, top-hole sizes must be sufficiently large so that the final casing has the desired inner diameter size.

Recently, expandable tubular technology has been developed to overcome this problem. Generally, expandable technology enables a smaller diameter tubular to pass through a larger diameter tubular, and thereafter expanded to a larger diameter. In this respect, expandable technology permits the formation of a tubular string having a substantially constant inner diameter, otherwise known as a monobore. Accordingly, monobore wells have a substantially uniform throughbore from the surface casing to the production zones.

A monobore well features each progressive borehole section being cased without a reduction of casing size. The monobore well offers the advantage of being able to start with a much smaller surface casing but still end up with a desired size of production casing. Further, the monobore well provides a more economical and efficient way of completing a well. Because top-hole sizes are reduced, less drilling fluid is required and fewer cuttings are created for cleanup and disposal. Also, a smaller surface casing size simplifies the wellhead design as well as the blow out protectors and risers. Additionally, running expandable liners instead of long casing strings will result in valuable time savings.

Typically, expandable liners are constructed of multiple tubulars connected end to end. The tubulars are generally connected using a threaded connection. As the threads are made up, a metal-to-metal seal is created between the two tubulars. Thereafter, the entire length of the expandable liner is deployed into the wellbore. The expandable liners are typically expanded by the use of a cone-shaped mandrel or by an expander tool, such as a rotary expander tool having one or more rollers.

A problem arises when the threaded connection is expanded. Generally, the male and female threads of a threaded connection are specifically designed to mate with each other to form a fluid tight seal. However, the specifications of the threads do not take into account the expansion of the threaded connection. By plastically deforming or expanding the threaded connection, the requirements of the threads to form a fluid tight seal are necessarily altered. For example, the tight metal-to-metal seal created between the female thread and the male thread becomes slack, thereby jeopardizing the seal at the threaded connection.

A solution for connecting expandable tubulars is disclosed in commonly assigned U.S. patent application Ser. No. 10/356,360, entitled "Flash Welding Process For Field Joining of Tubulars For Expandable Applications", filed on Jan. 31, 2003, which application is hereby incorporated by reference in its entirety. The application discloses an apparatus and method of flash welding the ends of two expandable tubulars together. Thereafter, the connected tubulars are lowered into the wellbore for expansion. The flash welding process for joining the tubulars provides a highly reliable joint for expansion.

One potential problem with field joining long length tubulars is the flash or weld penetration into the inner diameter of the tubular. One of the attributes inherent with a welding process such as flash welding is inner diameter and outer diameter flash. The flash on the outer diameter is typically not a problem because it is accessible for dressing as necessary for the application. The inner diameter flash represents a bore restriction that may be unacceptable for subsequent operations such as running tools into the well and expanding long sections of tubulars.

Due to its location in the connected tubular, the inner diameter flash is difficult to satisfactorily remove. Although the flash may be minimized through operating parameters, some flash is desirable because it is an indication of a good weld joint. The lack of measurable flash would represent an unacceptable weld quality level. Another method to reduce flash is to run scrapers into the tubular to smooth out the joint. However, scraper runs are time consuming and not cost effective.

A need, therefore, exists for a method of reducing the inner diameter flash created from welding two tubulars together. There is a further need for a method of reducing the inner diameter flash in a time saving manner. There is yet a further need for a method of reducing the inner diameter flash and smoothing out the inner surface of the welded joint. There is a further need for an apparatus for reducing the inner diameter flash of a tubular connection formed by welding.

SUMMARY OF THE INVENTION

Aspects of the present invention provide methods and apparatus for connecting two tubulars using a welding process with reduced inner diameter flash. The method includes connecting an end of a first expandable tubular to an end of a second expandable tubular using a welding process and reducing an inner diameter flash using a flash reducing device. In one embodiment, the flash reducing device is a plug disposed in the bore of the two tubulars. In another embodiment, the flash reducing device is a roller member. In yet another embodiment, the flash reducing device is a rotating cutting member.

In another aspect, a method of well completion includes connecting an end of a first expandable tubular to an end of a second expandable tubular using a welding process. The inner diameter flash is reduced before the connected tubulars are lowered into the wellbore, where a portion of the connected tubulars is expanded. The tubulars may be joined together using a welding process selected from a flash welding process, a butt welding process, a friction welding process, and combinations thereof.

In another aspect, an apparatus for connecting a first expandable tubular to a second expandable tubular is provided. The apparatus includes a housing disposable around an end of the first and second tubulars. The housing is equipped with a conductive member connected to each end of the tubulars and a translational member for moving the first tubular toward the second tubular. The apparatus further includes a flash reducing device for reducing an inner diameter flash. In one embodiment, the flash reducing device is a plug disposed in the bore of the two tubulars. In another embodiment, the flash reducing device is a roller member.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
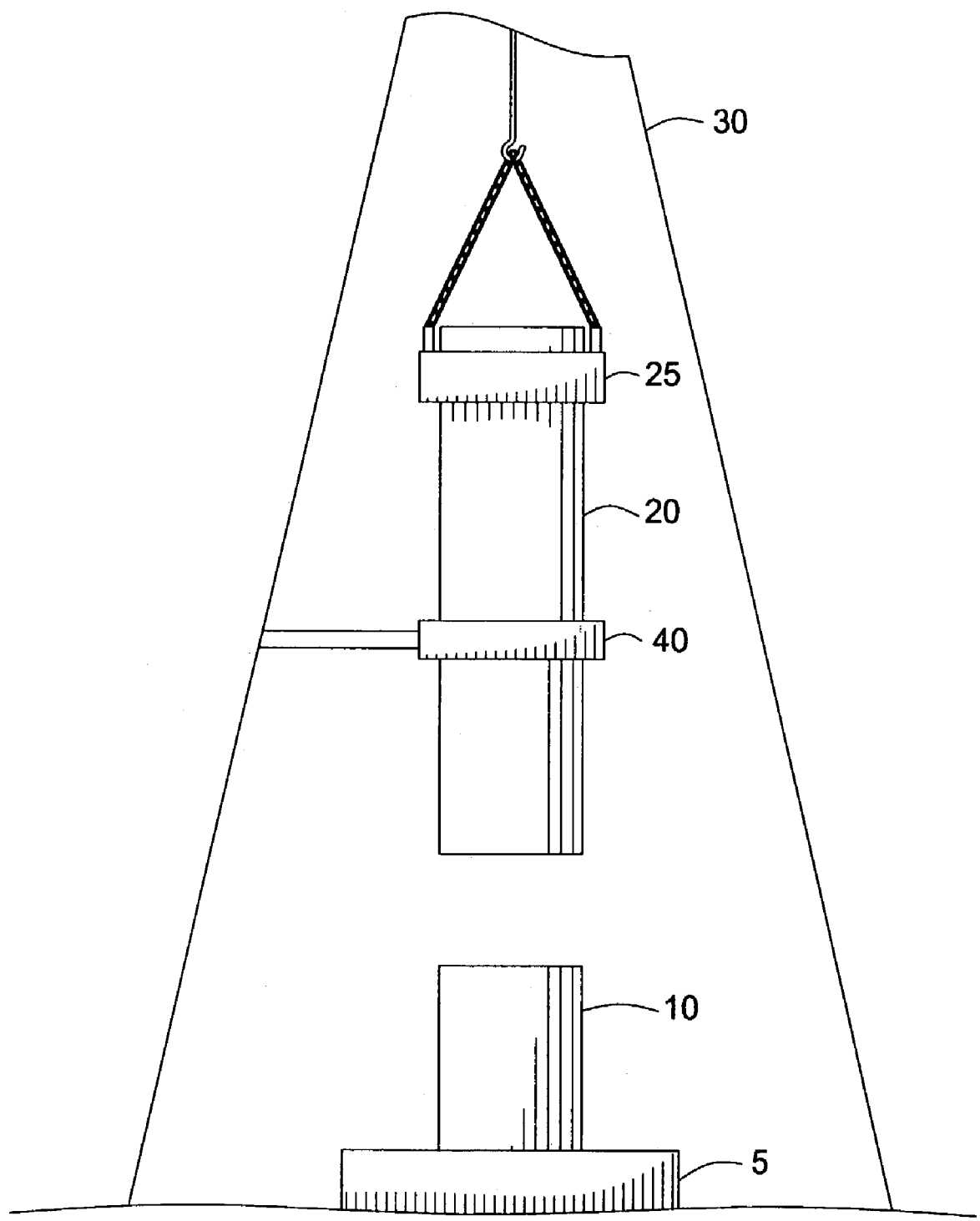
FIG. 1 is a cross-sectional view of a tubular positioned above another tubular held in a wellhead.

Aspects of the present invention provide apparatus and methods for reducing the inner diameter flash when two tubulars are connected using a flash welding process. As will be described in more detail below, the flash is reduced using a flash reducing device. FIG. 1 is a schematic view of a first tubular 10 ready to be joined with a second tubular 20. As shown, the first tubular 10 at least partially extends above the wellhead 5 and is held in place by a spider (not shown). The second tubular 20 is suspended above the first tubular 10 by an elevator 25 operatively connected to the rig 30. A tubular handling device 40 attached to the rig 30 may be used to help position the second tubular 20.

In one embodiment, the first and second tubulars 10, 20 are expandable tubulars to be joined and expanded downhole. Examples of expandable tubulars include expandable solid tubulars, expandable slotted tubulars, expandable screens, and combinations thereof. Further, the first and second tubulars 10, 20, as used herein, may include a single tubular or a tubular string formed by more than one tubular.

Figure 2:
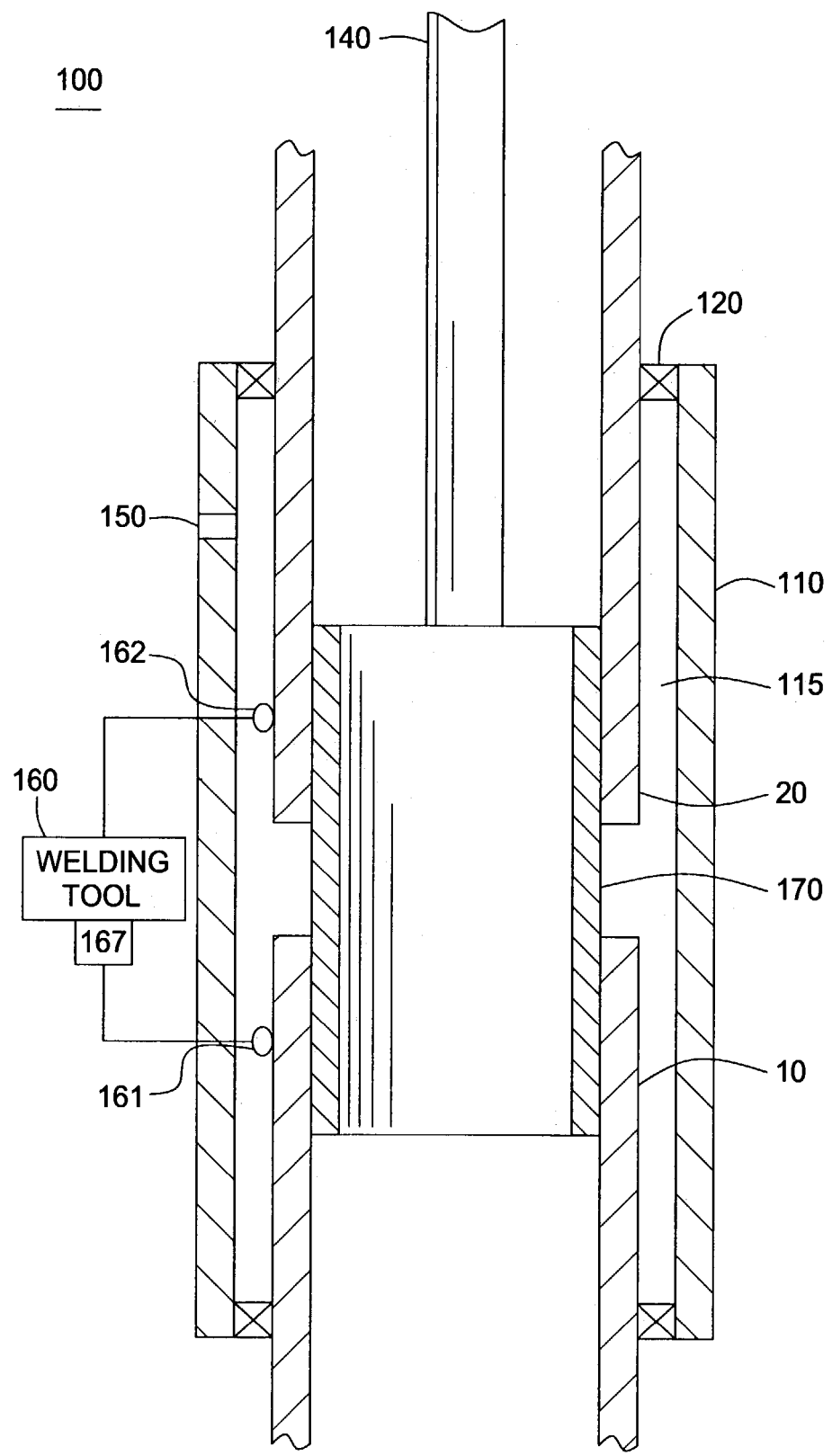
FIG. 2 illustrates two tubulars ready to be joined using a flash welding process. As shown, a plug is disposed between the tubulars to minimize the inner diameter flash.

FIG. 2 shows a flash welding assembly 100 for connecting the second tubular 20 to the first tubular 10 according to aspects of the present invention. The flash welding assembly 100 includes a tubular housing 110 at least partially disposed around the first and second tubulars 10, 20. One end of the housing 110 overlaps the first tubular 10 while the other end of the housing 110 overlaps the second tubular 20. Preferably, an inner diameter of the housing 110 is larger than an outer diameter of the tubulars 10, 20 such that an annular space 115 is formed therebetween. The housing 110 should be made from a material capable of tolerating the operating conditions. For example, the housing may be made of a metallic material that is capable of withstanding high temperatures. In one embodiment, the housing 110 defines a single sleeve tubular. In another embodiment, the housing 110 defines two arcuate portions hinged together. Spacers 120 may be placed at each end of the housing 110 to seal off the annular space 115. The spacers 120 may be made from an elastomeric material, metal, or combinations thereof.

In another aspect, a plug 170 may be disposed between the two tubulars 10, 20 to minimize or reduce the inner diameter flash formed when the two tubulars 10, 20 are welded together. The plug 170 may be attached to a conveying member 140 and positioned between the two tubulars 10, 20. As shown, the conveying member 140 is a rod. However, the conveying member 140 may also be a tubular, a wireline, a string, a cable, or combinations thereof. The outer diameter of the plug 170 should be slightly less than the inner diameter of the two tubulars 10, 20. The plug 170 may be made from a variety of materials that does not allow the plug 170 to become attached to the joint and has sufficient strength to prevent the formation of the flash. In one embodiment, the plug 170 may be made of a ceramic material such as alumina, other non-weld material, or combinations thereof. In another embodiment, the plug 170 may be made of metal and the outer surface of the plug 170 is coated with a non-weld material. Although the plug 170 is shown as a tubular, it is also envisioned that the plug 170 may be a solid cylindrical plug 170. It is believed that by using a plug 170, the forging pressure of the flash welding process is turned on itself. As a result, the displaced metal of the flash is forced back into the body of the tubulars 10, 20, thereby preventing the inner diameter flash from occurring.

In another aspect, one or more ports 150 are formed in the housing 110 to provide gas into the area enclosed by the plug 170 and the housing 110. Preferably, the supplied gas is an inert gas, a non-flammable gas, or combinations thereof. The inert gas may supplant or dilute the air in the enclosed area, thereby decreasing the possibility of oxide forming on the heated tubulars 10, 20. Impurities such as oxide formed during the welding process are undesirable because they weaken the bond between the joined tubulars 10, 20. As shown in FIG. 2, the ports 150 are formed on a wall of the housing 110. However, the ports 150 may also be formed in the spacers 120 or other suitable surface of the housing 110 as is known to a person of ordinary skill in the art.

The flash welding assembly 100 may also include a welding tool 160, which is schematically shown in FIG. 2. The welding tool 160 may be used to supply the current necessary to perform the flash welding process. The welding tool 160 may be selected from any suitable flash welding machine as is known to a person of ordinary skill in the art. An exemplary flash welding tool may comprise a bank of 12-volt lead-acid batteries or a direct current generator with appropriate tubular gripping members to handle the relative positioning of the tubular members throughout the joining process.

As schematically shown in FIG. 2, the welding tool 160 has at least one set of conductive members 161, 162 for contacting each tubular 10, 20. In one embodiment, conductive members 161, 162 comprise clamps and are used to contact the tubulars 10, 20 and to provide current to the tubulars 10, 20 for the flash welding process. The clamps 161, 162 may be equipped with gripping members or slip members (not shown) to facilitate handling of the tubulars 10, 20. The welding tool 160 may further include a translational member 167 for moving the tubulars 10, 20 toward each other. In one embodiment, the translational member 167 may comprise a piston and cylinder assembly to bring the clamps 161, 162 cloer to each other. With the first tubular 10 held stationary, the piston and cylinder assembly 167 may force the second tubular 20 into greater contact with the first tubular 10 through the heated weld interface.

In operation and as one example of the process, the second tubular 20 is positioned above the first tubular 10 in the wellbore as shown in FIG. 1. Once in position, a clamp 161, 162 is attached to each tubular 10, 20 proximate the ends of the tubulars 10, 20 to be joined. Thereafter, the housing 110 is disposed around the tubulars 10, 20. The plug 170 is then placed in the bore of each tubular 10, 20. Thereafter, inert gas is injected through the ports 150 of the housing 110 into the enclosed area to displace most of the air.

The welding process begins by bringing the tubulars 10, 20 into contact with each other. During the flash welding process, current is applied to each tubular 10, 20 through the clamps 161, 162. The current applied initially results in heating of each tubular 10, 20 due to the electrical circuit formed by contacting the tubular ends. The resistance that naturally occurs at the interface between the tubulars 10, 20 causes the "flashing" for which the joining process is known. The flashing action continues until the ends of the tubulars 10, 20 reach a plastic state and a predetermined temperature.

The flash welding process concludes with the upset or forging action. When the tubulars 10, 20 have reached the plastic state and the proper temperature, the ends of the tubulars 10, 20 are further urged together with enough force to cause the tubular ends to upset. Particularly, the piston and cylinder assembly 167 of the welding tool 160 is actuated to cause the contacting end of the second tubular 20 to move into the contacting end of the first tubular 10. The speed of the movement between tubulars 10, 20 for the upset action may be continued by adjusting the piston size or rate of pressure increase. The upset action forces the plastic portions and most of the impurities out of the formed joint. Alternatively, the plug 170 may be designed to fracture under the forces or the Thermal gradients of the joining process.

As discussed above, it is believed that the plug 170 turns the forging pressure of the flash welding process on itself. As a result, the metal displaced during the forging action is forced back into the body of the tubulars 10, 20, thereby preventing the inner diameter flash from occurring. In this manner, the inner diameter flash may be minimized when two tubulars 10, 20 are joined together using the flash welding process. After the tubulars 10, 20 have been connected, the plug 170 may be retrieved by pulling up on the conveying member 140.

Additional tubulars may be added to the joined tubulars to form a longer tubular string. When the proper length of tubular string has been formed, the tubular string may be lowered into the wellbore along with an expander tool. After the tubular string reaches the proper depth in the wellbore, the expander tool is actuated to expand the tubular string. Examples of the expander tool include rotary expander tools and cone-shaped mandrels. In this respect, the flash welded joint is plastically deformed, but retains its fluid tight seal. In this manner, expandable tubulars may be joined and expanded downhole.

Figure 3:
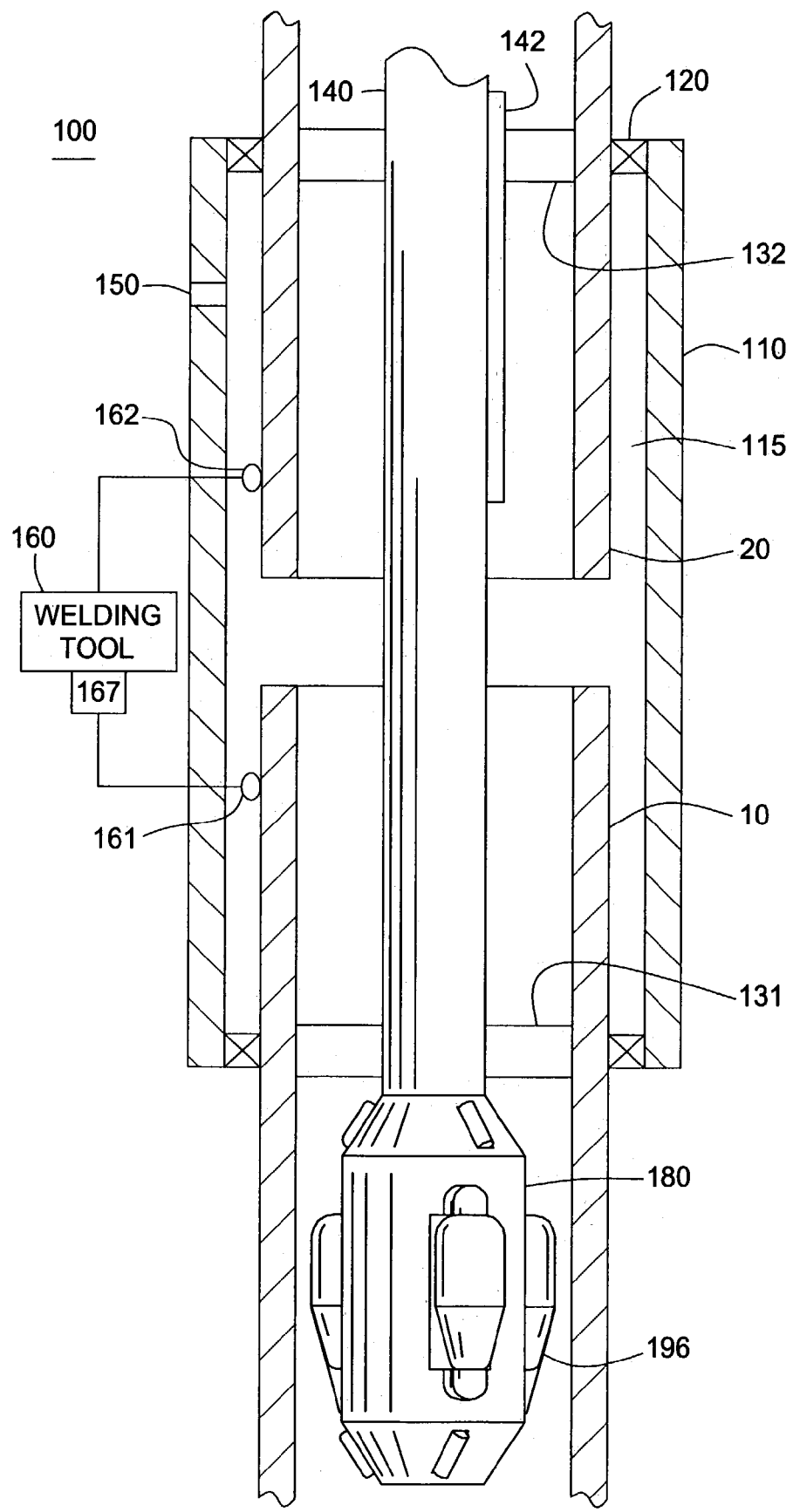
FIG. 3 illustrates another embodiment of an apparatus for minimizing the inner diameter flash formed when two tubulars are joined together using a flash welding process.

FIG. 3 illustrates another embodiment of an apparatus for reducing the inner diameter flash according to aspects of the present invention. In this embodiment, the inner diameter flash is rolled into the body of the tubulars 10, 20 using a roller member 180.

Shown in FIG. 3 are two expandable tubulars 10, 20 to be connected using a flash welding process. Also shown is a flash welding assembly 100 for connecting the tubulars 10, 20. The assembly 100 includes a housing 110 having one or more spacers 120 disposed around the tubulars 10, 20. The assembly 100 may also include a welding tool 160. The welding tool 160 may be used to supply the current necessary to perform the flash welding process. The welding tool 160 may be selected from any suitable flash welding machine as is known to a person of ordinary skill in the art. The welding tool 160 has at least one set of conductive members 161, 162 for contacting each tubular 10, 20. In one embodiment conductive members 161, 162 comprise clamps and are used to contact the tubulars 10, 20 and to provide current to the tubulars 10, 20 for the flash welding process. The welding tool 160 may further include a translational member 167 for moving the tubulars 10, 20 toward each other.

Also shown in FIG. 3 are one or more sealing elements 131, 132 disposed within the first and second tubulars 10, 20 to seal off the bores of the tubulars 10, 20. In one embodiment, sealing elements 131, 132 comprise inflatable packers and are used to seal off the tubulars 10, 20. The Inflatable packers 131, 132 may be connected to a tubular conveying member 140 for positioning the inflatable packers 131, 132. The conveying member 140 may be in fluid communication with the packers 131, 132 so that it may provide pressure to actuate the packers 131, 132.

In another aspect, the conveying member 140 may optionally include a second conveying member 142 for providing an inert gas into the area enclosed by the packers 131, 132 and the housing 110. The inert gas may supplant or dilute the air in the enclosed area, thereby decreasing the possibility of oxide forming on the heated tubulars 10, 20. In another embodiment, the inert gas may be delivered through one or more ports 150 formed in the housing 110. It must be noted that the ports 150 may be used in combination with the second conveying member 142 to inject inert gas into the enclosed area.

Figure 5:
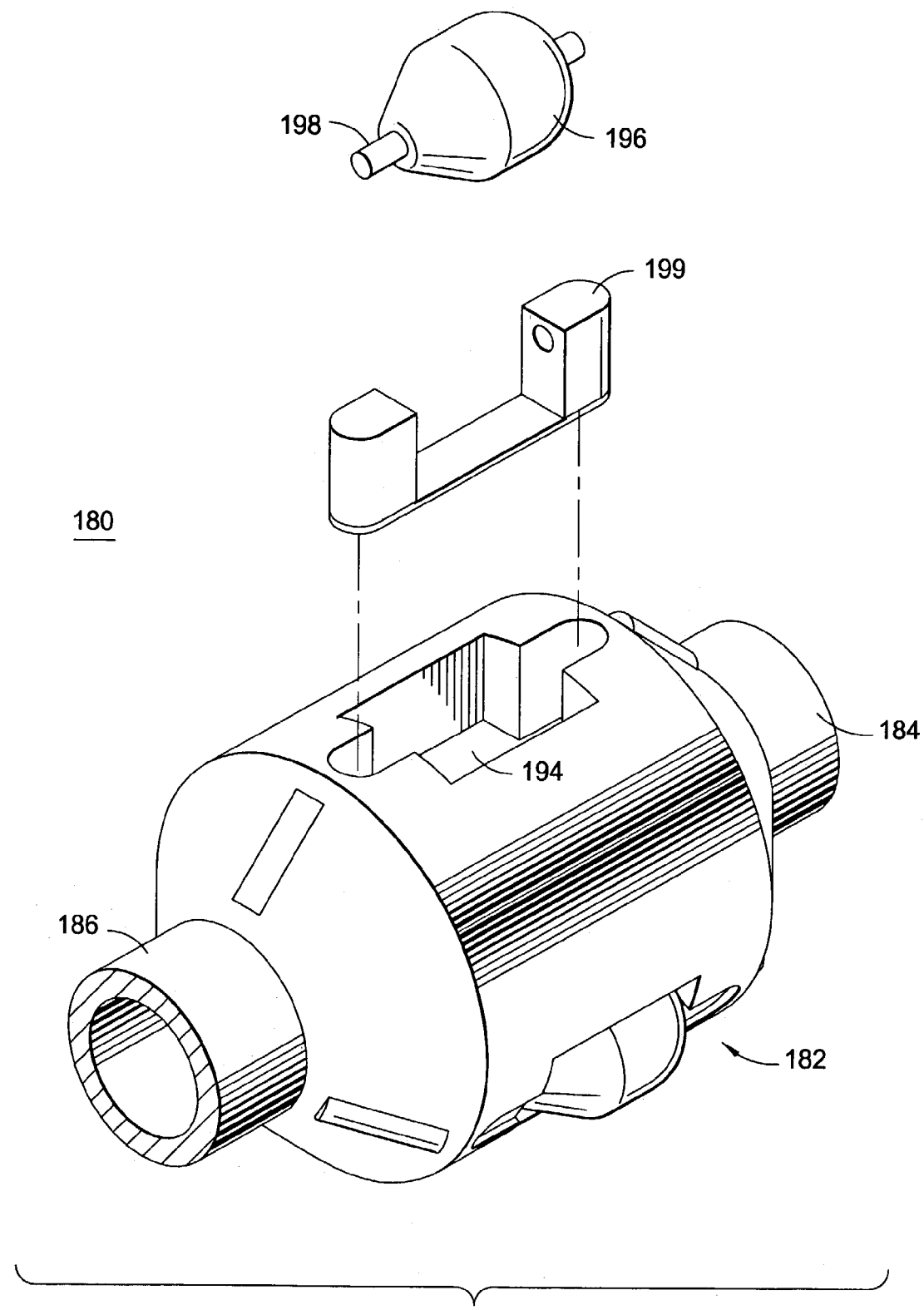
FIG. 5 illustrates an exemplary roller member for reducing the inner diameter flash.

The inner diameter flash of the present embodiment is reduced or minimized by a roller member 180 rolled against the inner surface of the welded joint. The roller member 180 may be connected to the conveying member 140 at a location below the inflatable packers 131, 132. FIG. 5 is an exploded view of an exemplary roller member 180 for rolling the inner diameter flash. The roller member 180 has a body 182, which is hollow and generally tubular with connectors 184 and 186 for connection to other components (not shown). The connectors 184 and 186 are of a reduced diameter compared to the outside diameter of the longitudinally central body part of the roller member 180. The central body part 182 of the roller member 180 shown in FIG. 5 has three recesses 194, each holding a respective roller 196. Each of the recesses 194 has parallel sides and extends radially from a radially perforated tubular core (not shown) of the roller member 180. Each of the mutually identical rollers 196 is somewhat cylindrical and barreled. Each of the rollers 196 is mounted by means of an axle 198 at each end of the respective roller 196 and the axles are mounted in slidable pistons 199. The rollers 196 are arranged for rotation about a respective rotational axis that is parallel to the longitudinal axis of the roller member 180 and radially offset therefrom at 120-degree mutual circumferential separations around the central body 182. The axles 198 are formed as integral end members of the rollers 196, with the pistons 199 being radially slidable, one piston 199 being slidably sealed within each radially extended recess 194. The inner end of each piston 199 is exposed to the pressure of fluid within the hollow core of the roller member 180 by way of the radial perforations in the tubular core. In this manner, pressurized fluid provided from the conveying member 140 can actuate the pistons 199 and cause them to extend outward whereby the rollers 196 contact the inner wall of the tubulars 10, 20 to be expanded. It must be noted that aspects of the present invention also contemplate other types of roller members, such as a tapered roller bearings, known to a person of ordinary skill in the art.

FIG. 3 depicts the roller member 180 with the rollers 196 retracted, so that the roller member 180 may be easily moved within the tubulars 10, 20 and placed in the desired location for expansion of the tubulars 10, 20. Hydraulic fluid is pumped to the roller member 180 through the conveying member 140. When the roller member 180 has been located at the desired depth, hydraulic pressure is used to actuate the pistons (not shown) and to extend the rollers 196 so that they may contact the inner surface of the tubulars 10, 20, thereby exerting a force against the tubulars 10, 20.

In operation, the conveying member 140 along with the inflatable packers 131, 132 and the roller member 180 are disposed in the tubulars 10, 20. Thereafter, the inflatable packers 131, 132 are actuated to seal off an area between the housing 110 and the packers 131, 132. Then, inert gas is injected into the housing 110 to displace the air in the enclose area.

During the flash welding process, the tubulars 10, 20 are brought into contact with each other, and current is applied to the tubulars 10, 20 through the clamps 161, 162. The "flashing" action continues until the ends of the tubulars 10, 20 reach a plastic state. Thereafter, the translational member 167 further urges the ends of the tubulars 10, 20 together with enough force to cause the tubular ends to upset. The upset action forces the plastic portions and most of the impurities out of the formed joint.

Figure 4:
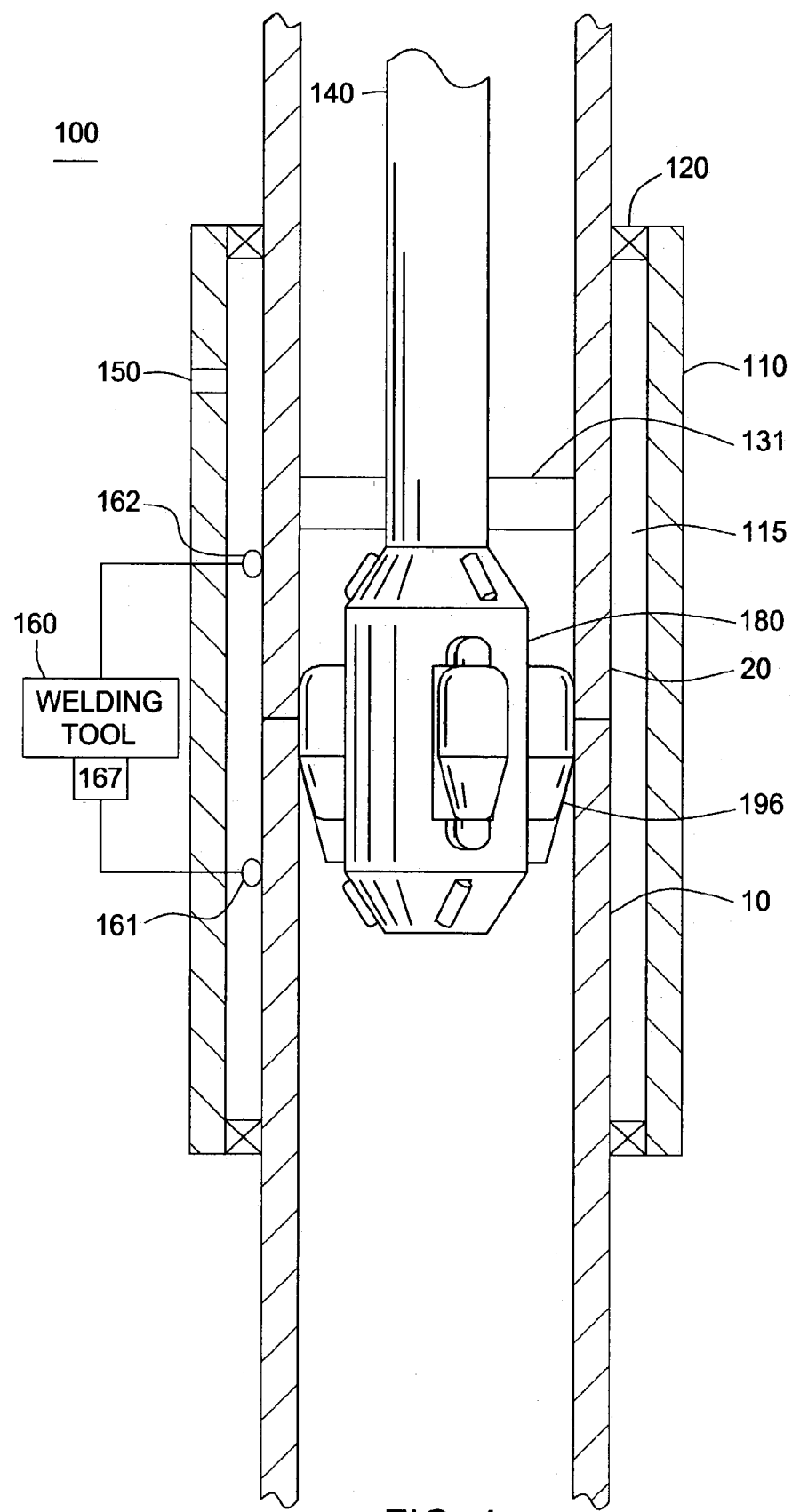
FIG. 4 illustrates the inner diameter flash reduced by the apparatus shown in FIG. 3.

FIG. 4 is a view of the inner diameter flash partially reduced by the roller member 180. The roller member 180 is actuated by supplying fluid to the pistons (not shown), thereby extending the rollers 196 until they contact the inner surface of the tubulars 10, 20. During the flash reduction process, the roller member 180 is both rotated and translated axially. The roller member 180 may be rotated by rotating the conveying member 140. In this respect, the roller member 180 exerts a force on the inner diameter flash, thereby reducing the inner diameter of the flash to substantially the same inner diameter as the tubulars 10, 20. Preferably, the flash reduction process is performed while the welded joint is still hot or in a softened state. In this manner, the inner diameter flash is minimized when two tubulars 10, 20 are connected using a flash welding process.

It must noted that although the embodiments presented herein have been described with a flash welding process, aspects of the present invention are equally applicable to welding processes in general, including butt welding, friction welding, and other types of welding requiring a reduction of the inner diameter flash.

Figure 6:
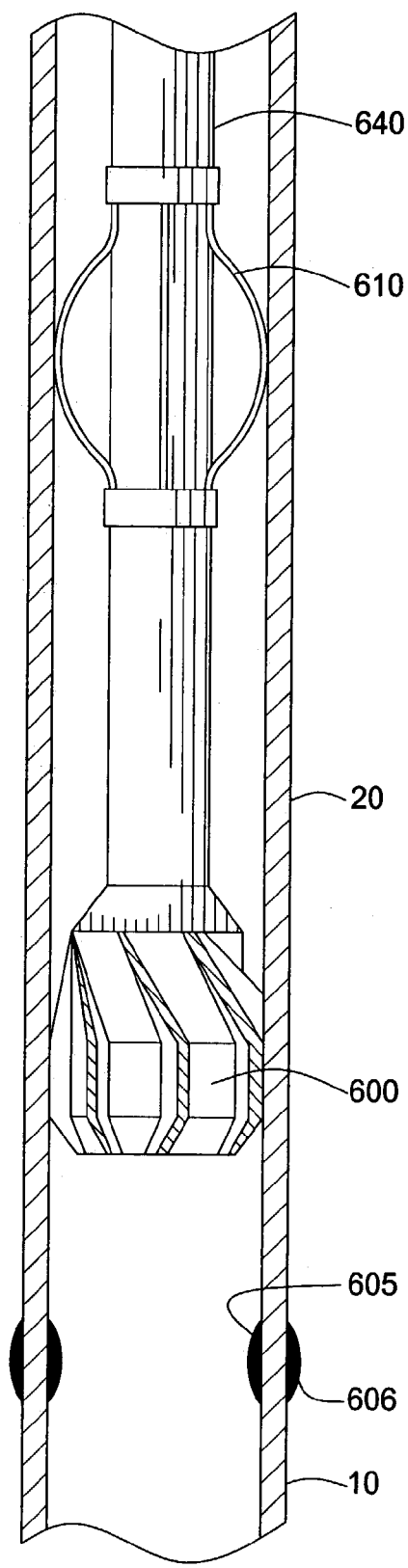
FIG. 6 illustrates a rotating cutting member for reducing the inner diameter flash formed.

In another aspect, an inner diameter flash 605 may be reduced by a rotating cutting member 600 as illustrated in FIG. 6. Shown in FIG. 6 is a tubular string formed by welding two tubulars together 10, 20. Also shown is the inner diameter flash 605 and outer diameter flash 606 resulting from the welding process. As shown, the inner diameter flash 605 protrudes into the bore of the tubulars 10, 20 thereby restricting the bore.

In one embodiment, the rotating cutting member 600 is attached to a conveying member 640 for rotation thereof. A centralizer 610 is disposed on the conveying member 640 to centralize the rotating cutting member 600 to prevent the cutting member 600 from cutting into the inner wall of the tubular string. The cutting member 600 may include a milling outer surface as shown in FIG. 6. Preferably, an outer diameter of the cutting member 600 is slightly less than the inner diameter of the tubulars 10, 20. The cutting member 600 may also be equipped with other types of cutting or abrasive surfaces such as blades, inserts, carbides, and other material capable of removing the inner diameter flash 605 as is known to a person of ordinary skill. In another embodiment, it is contemplated that the rotating cutting member 600 may be used with the sealing elements 131, 132 of FIG. 3 in place of the roller member 180.

Figure 7:
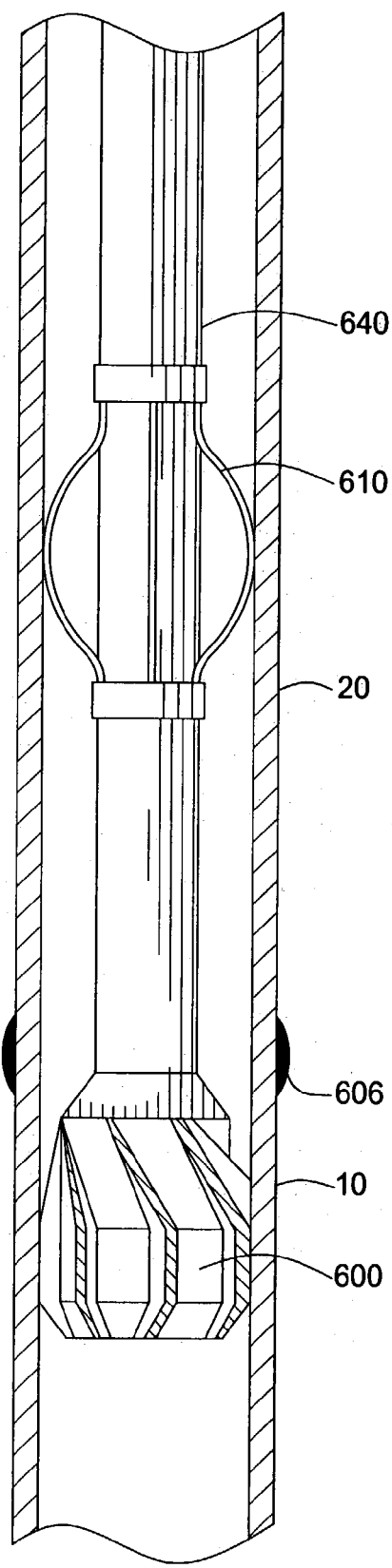
FIG. 7 illustrates the inner diameter flash reduced by the rotating cutting member shown in FIG. 6.

In operation, the cutting member 600 is rotated to rotate the milling surface and traversed axially along the inner wall of the tubulars 10, 20. In turn, the rotating milling surface removes portions of the inner diameter flash 605 that protrude into the bore of the tubulars 10, 20. In FIG. 7, the cutting member 600 has moved past the inner diameter flash 605, thereby reducing the inner diameter flash 605. In this manner, the restriction created by the inner diameter flash 605 is removed from the welded joint.

While the foregoing is directed to embodiments of the present invention, other and further embodiments of the invention may be devised without departing from the basic scope thereof, and the scope thereof is determined by the claims that follow.

I claim:

1. A method of connecting tubulars at a well surface, comprising:

using a welding process to connect an end of a first tubular to an end of a second tubular, the second tubular having an inner diameter and extending into a wellbore, wherein the welding process creates a flash at an inner diameter junction between the first and second tubulars; and flattening the inner diameter flash to a diameter substantially equal to the inner diameter.

2. The method of claim 1, wherein the welding process is selected from the group consisting of a flash welding process, a butt welding process, a friction welding process, and combinations thereof.

3. The method of claim 2, wherein the flash welding process comprises:

causing the ends of the tubulars to become plastic; and connecting the two ends of the tubulars together.

4. The method of claim 1, wherein a flash reducing device comprises a roller member or a rotating cutting member.

5. The method of claim 4, wherein reducing the inner diameter flash comprises at least partially removing the inner diameter flash while the inner diameter flash is in a softened state.

6. The method of claim 1, wherein the tubulars are expandable.

7. A method of connecting tubulars at a well surface, comprising:

using a welding process to connect an end of a first tubular to an end of a string of tubulars extending from a wellbore; and preventing an inner diameter flash formation using a plug disposed at least partially within a bore of the tubulars.

8. The method of claim 7, wherein an outer diameter of the plug is about the same size as an inner diameter of the tubulars.

9. The method of claim 7, wherein the plug comprises a tubular or a solid cylinder.

10. The method of claim 7, further comprising positioning the plug in the bore of the tubulars using a conveying member.

11. The method of claim 10, wherein the conveying member is selected from the group consisting of a wireline, tubular, rod, string, cable, and combinations thereof.

12. The method of claim 7, wherein the plug comprises a material selected from the group consisting of ceramic, metal, non-weld material, and combinations thereof.

13. The method of claim 7, wherein the plug comprises a material that does not allow the plug to become attached to the inner diameter flash.

14. A method of connecting tubulars at a well surface, comprising:
using a welding process to connect an end of a first tubular to an end of a string of tubulars extending from a wellbore; and
flattening an inner diameter flash using a roller member.

15. The method of claim 14, wherein flattening the inner diameter flash comprises rolling the roller member across the inner diameter flash.

16. The method of claim 15, further comprising rotating the roller member.

17. The method of claim 14, wherein the roller member comprises an expandable roller or a tapered roller bearing.

18. The method of claim 17, wherein one or more rollers of the expandable roller are extended radially into contact with the inner diameter flash.

19. The method of claim 14, wherein the tubulars are expandable.

20. A method of connecting tubulars at a well surface, comprising:
using a welding process to connect an end of a first tubular to an end of a string of tubulars extending from a wellbore;
centering a rotating cutting member in a bore of the tubulars by utilizing a centralizer; and
reducing an entire circumference of an inner diameter flash simultaneously using the rotating cutting member.

21. The method of claim 20, wherein the rotating cutting member comprises a milling, cutting, or abrasive outer surface.

22. The method of claim 20, wherein the tubulars are expandable.

23. A method of well completion, comprising:
connecting an end of a first expandable tubular to an end of a second expandable tubular at a well surface using a welding process;
flattening an inner diameter flash of at least a portion of one or both of the tubulars to a pre-welded inner diameter including the connection; and
lowering the connected tubulars into a wellbore.

24. The method of claim 23, wherein the welding process is selected from the group consisting of a flash welding process, a butt welding process, a friction welding process, and combinations thereof.

25. The method of claim 24, wherein the flash welding process comprises:
causing the ends of the tubulars to become plastic; and
connecting the two ends of the tubulars together.

26. The method of claim 24, wherein the welding process is at least partially performed in a housing.

27. The method of claim 26, wherein an annular space is formed between the housing and at least one of the tubulars.

28. The method of claim 27, further comprising sealing off the annular space using one or more spacers.

29. The method of claim 27, further comprising providing a non-flammable gas to the annular space.

30. The method of claim 23, further comprising disposing one or more sealing elements in a bore of each tubular.

31. The method of claim 27, further comprising actuating the one or more sealing elements to seal off the bore of each tubular.

32. The method of claim 23, wherein flattening the inner diameter flash comprises removing the inner diameter flash using a roller member or a rotating cutting member.

33. The method of claim 32, wherein reducing the inner diameter flash comprises removing the inner diameter flash while the inner diameter flash is in a softened state.

34. An apparatus for connecting a first tubular to a second tubular at a well surface, comprising:
a housing disposable around an end of the first and second tubulars;
a flash reducing device for reducing an inner diameter flash;
a conductive member connected to an end of each of the tubulars; and
a translational member for moving the first tubular toward the second tubular.

35. The apparatus of claim 34, wherein the flash reducing device comprises a device selected from the group consisting of:
a plug disposable at least partially within a bore of the first and second tubulars;
a roller member; and
a rotating cutting member.

36. The apparatus of claim 35, wherein the plug is adapted to reduce the formation of inner diameter flash when disposed at least partially within the bore of the first and second tubulars.

37. The apparatus of claim 36, wherein an outer diameter of the plug is substantially the same size as an inner diameter of the first and second tubulars.

38. The apparatus of claim 36, wherein the plug comprises a tubular or a solid cylindrical plug.

39. The apparatus of claim 36, wherein the plug comprises a material that does not allow the plug to become attached to the inner diameter flash.

40. The apparatus of claim 36, wherein the roller member comprises an expandable roller or a tapered roller bearing.

41. The apparatus of claim 40, wherein one or more rollers of the expandable roller are adapted to be extended radially into contact with the inner diameter flash.

42. The apparatus of claim 34, further comprising one or more sealing members disposed within each of the tubulars.

43. The apparatus of claim 42, wherein the housing and the one or more sealing elements are adapted to cooperate and isolate the ends of the tubulars to be joined.

44. The apparatus of claim 34, wherein the first and second tubulars are expandable tubulars.

* * * * *